(12) United States Patent
James

(10) Patent No.: US 7,334,995 B2
(45) Date of Patent: Feb. 26, 2008

(54) TURBINE BLADE ASSEMBLY AND METHOD OF MANUFACTURE

(75) Inventor: Allister W. James, Orlando, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 121 days.

(21) Appl. No.: 11/285,832

(22) Filed: Nov. 22, 2005

(65) Prior Publication Data

US 2007/0116575 A1    May 24, 2007

(51) Int. Cl.
*F01D 5/30* (2006.01)
(52) U.S. Cl. .................. 416/193 A; 416/248; 29/889.7
(58) Field of Classification Search ............ 416/193 A, 416/223 A, 248, 214 A, 239; 29/889.7
See application file for complete search history.

(56) References Cited

U.S. PATENT DOCUMENTS

| | | | |
|---|---|---|---|
| 3,627,015 A * | 12/1971 | Giamei et al. ................. 164/15 |
| 4,501,053 A | 2/1985 | Craig et al. | |
| 4,650,399 A * | 3/1987 | Craig et al. .................. 416/248 |
| 4,869,645 A | 9/1989 | Verpoort | |
| 4,921,405 A | 5/1990 | Wilson | |
| 4,934,583 A | 6/1990 | Patsfall | |
| 5,071,059 A | 12/1991 | Heitman et al. | |
| 5,318,406 A | 6/1994 | Bardes | |
| 6,004,101 A * | 12/1999 | Schilling et al. ............. 416/248 |
| 6,095,755 A | 8/2000 | Houston | |
| 6,325,871 B1 | 12/2001 | Burke et al. | |
| 6,331,217 B1 | 12/2001 | Burke et al. | |
| 6,709,771 B2 | 3/2004 | Allister | |
| 7,080,971 B2 * | 7/2006 | Wilson et al. ................. 416/92 |
| 2002/0114701 A1 | 8/2002 | Coulson | |
| 2003/0217792 A1 | 11/2003 | James | |
| 2004/0223850 A1 | 11/2004 | Kramer et al. | |

* cited by examiner

*Primary Examiner*—Richard A. Edgar

(57) ABSTRACT

Aspects of the invention are directed to a turbine blade assembly and an associated method of manufacture. The turbine blade assembly can include: (a) a unitary structure having an airfoil and a primary root portion; (b) a separately-formed platform; and (c) a secondary root portion that cooperates with the primary root portion to define a root. The platform can be secured in place between the structure and the secondary root portion. In a preferred embodiment, the structure can be formed by casting, and the secondary root portion can be formed by powder metallurgy. Ideally, the structure is configured so as to avoid large changes in section size or to at least make such changes gradual, particularly in transitioning from the airfoil to the primary root portion. The turbine blade assembly can reduce the propensity for defects to form during the manufacturing process. Thus, higher casting yields can be realized.

16 Claims, 6 Drawing Sheets

TURBINE BLADE ASSEMBLY AND METHOD OF MANUFACTURE

FIELD OF THE INVENTION

The invention relates in general to turbine engines and, more particularly, to turbine blades.

BACKGROUND OF THE INVENTION

Turbine blades are usually unitary structures with an airfoil portion, a platform portion and a root portion. Turbine blades are typically formed by casting, which may additionally involve the use of directional solidification techniques. The casting yield of turbine blades, especially those made of advanced single crystal alloys, can be as low as about five percent. One of the primary reasons for such low yields is casting defects. Examples of casting defects include secondary nucleated grains, freckle chains or other grain boundaries.

Such defects commonly occur in areas where there are large geometric changes in section size, particularly where there is a large increase in section size. In a turbine blade, one such area is in the transition region between the airfoil and the platform. Defects are frequently initiated in this transition region when the blade is formed using directional solidification techniques with the airfoil portion down and the root portion up, so that the direction of crystal growth is from the blade tip toward the root. In such case, there is a large increase in cross-sectional area as the airfoil portion transitions into the platform portion. Another area where defects have been known to develop is in the root portion of the blade, such as on the root shank.

Thus, there is a need for a turbine blade construction that can minimize the formation of such casting defects.

SUMMARY OF THE INVENTION

Aspects of the invention are directed to a turbine blade assembly. The assembly includes a unitary structure that has an airfoil and a primary root portion, a separately formed platform and a secondary root portion. The primary and secondary root portions cooperatively define a root. The platform is secured between the structure and the secondary root portion. The platform can further be secured to at least the structure by bonding. The structure can be made of various materials, including single crystal alloys.

In one embodiment, the platform can be made of a single piece with a passage extending therethrough. In such case, the primary root portion can be received within the passage. Alternatively, the platform can be made of a plurality of platform segments. The platform can be made of a single crystal alloy.

The primary root portion can extend from a substantially central region of the airfoil. The structure can include a region in which the airfoil transitions into the primary root portion. In one embodiment, the cross-sectional size of the airfoil can be greater than the cross-sectional size of the primary root portion in at least the region. In such case, a portion of the airfoil can overhang the first root portion so as to define a lip. The platform can be secured between the lip and the secondary root portion. In another embodiment, the cross-sectional size of the airfoil can be substantially identical to the cross-sectional size of the primary root portion in at least the region. In still another embodiment, the cross-sectional size of the airfoil can be less than the cross-sectional size of the primary root portion in at least the region.

Aspects of the invention are directed to a method of forming a turbine blade. The method includes the step of forming a unitary structure that has an airfoil and a portion of a root. The structure includes a transition region between the airfoil and the portion of the root. The unitary structure can be formed by casting or using directional solidification.

The cross-sectional size of the portion of the root can be less than the cross-sectional size of the airfoil at least in the transition region. Alternatively, the cross-sectional size of the portion of the root can be substantially equal to the cross-sectional size of the airfoil at least in the transition region. In yet another alternative embodiment, the cross-sectional size of the portion of the root can be slightly greater than the cross-sectional size of the airfoil at least in the transition region.

A platform is separately-formed, such as by casting, machining or forging. The platform is positioned into engagement with the transition region of the structure. In one embodiment, the platform can also be bonded to the unitary structure. The root is completed to its final design dimensions so that the platform is secured between the structure and the root. In one embodiment, the root can be completed by a powder metallurgy process.

Aspects of the invention are directed to another method of forming a turbine blade. According to the method, a unitary structure is cast. The unitary structure has an airfoil, a portion of a root and a transition region therebetween. A platform is separately formed and is positioned into engagement with the transition region. Lastly, the root is completed to its final design dimensions by forming a secondary root portion using powder metallurgy. As a result, the platform is secured between the structure and the secondary root portion.

DETAILED DESCRIPTION OF EMBODIMENTS OF THE INVENTION

Aspects of the invention are directed to a turbine blade construction that can reduce the propensity for casting defects to develop during manufacture. Aspects of the invention will be explained in connection with one blade assembly and an associated method of manufacture, but the detailed description is intended only as exemplary. Embodiments of the invention are shown in FIGS. 1-5, but the present invention is not limited to the illustrated structure or application.

Figure 1:
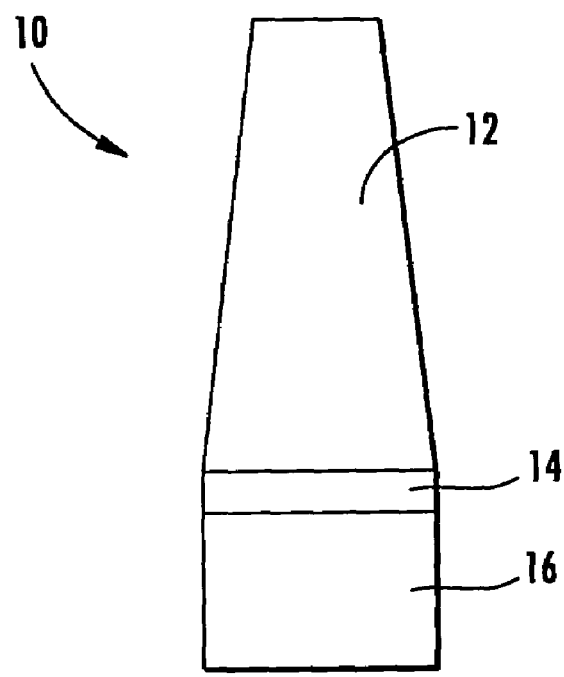
FIG. 1 is a front elevational view of a turbine blade assembly according to aspects of the invention.
Figure 5:
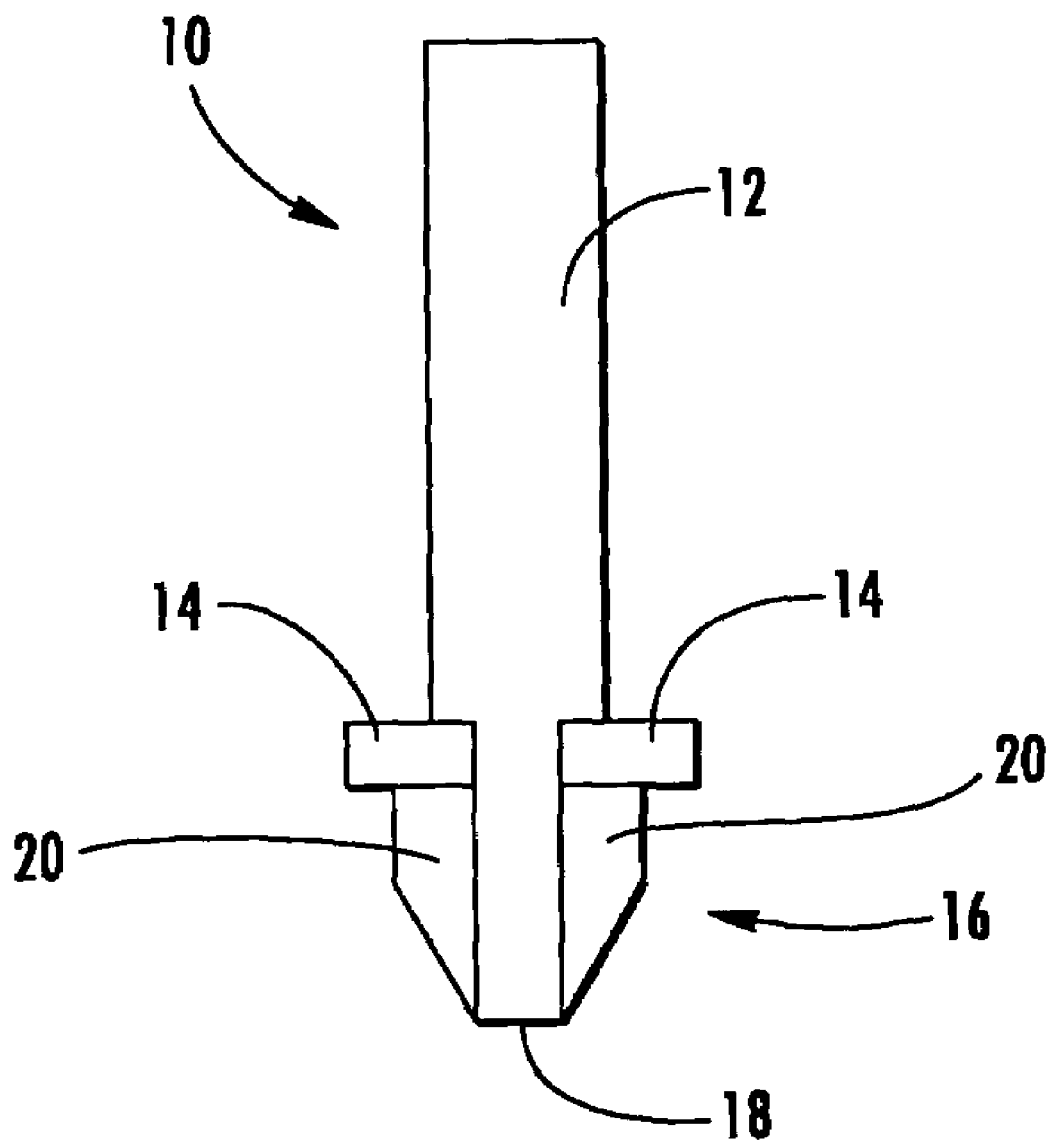
FIG. 5 is a side elevational view of the turbine blade assembly according to aspects of the invention, showing a root completed by a secondary root portion, wherein the secondary root portion contributes to the securement of the platform.
Figure 6:
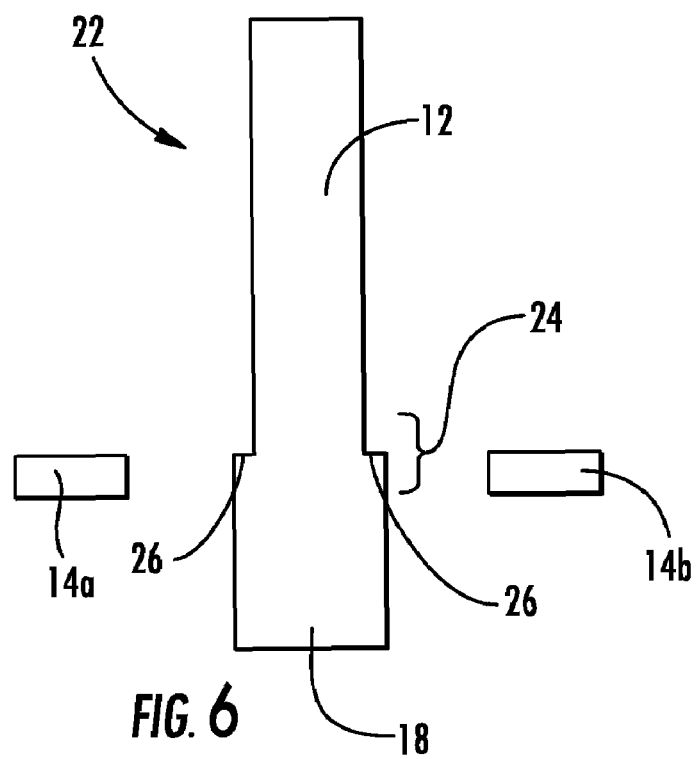
FIG. 6 is a side elevational view of the subcomponents of the turbine blade assembly according to further aspects of the invention, showing a separately-formed platform and a structure having an airfoil and a primary root portion.
Figure 7:
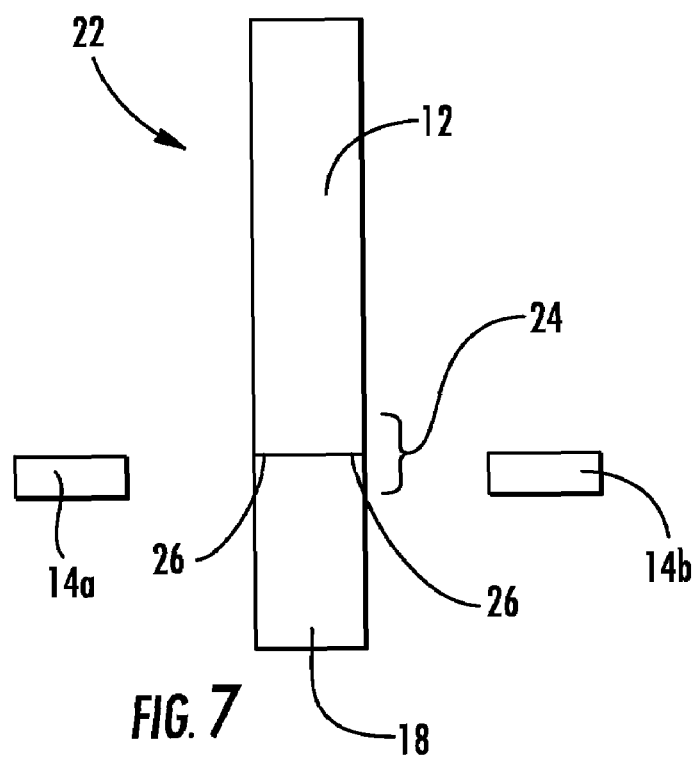
FIG. 7 is a side elevational view of the subcomponents of the turbine blade assembly according to still further aspects of the invention, showing a separately-formed platform and a structure having an airfoil and a primary root portion.
Figure 8:
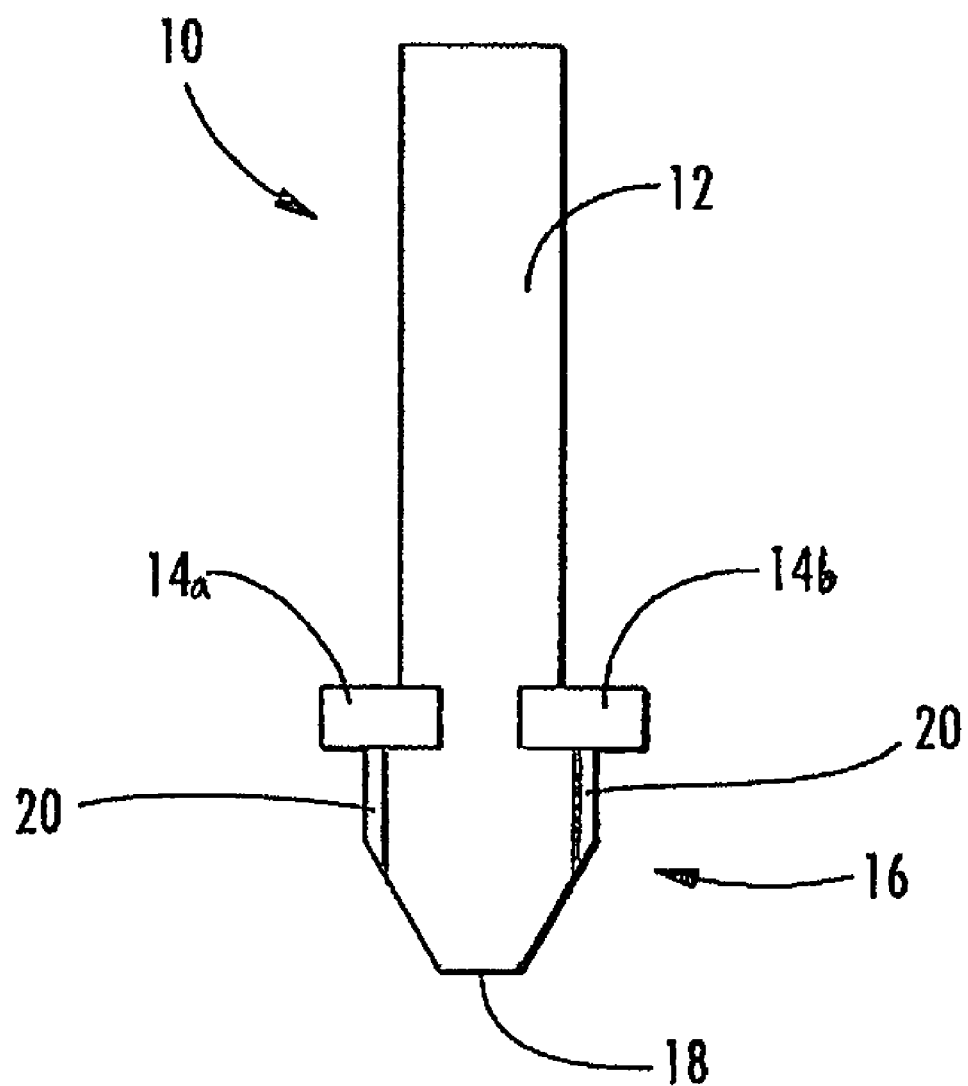
FIG. 8 is a side elevational view of the turbine blade assembly according to further aspects of the invention, showing a root completed by a secondary root portion, wherein the secondary root portion contributes to the securement of the platform.
Figure 9:
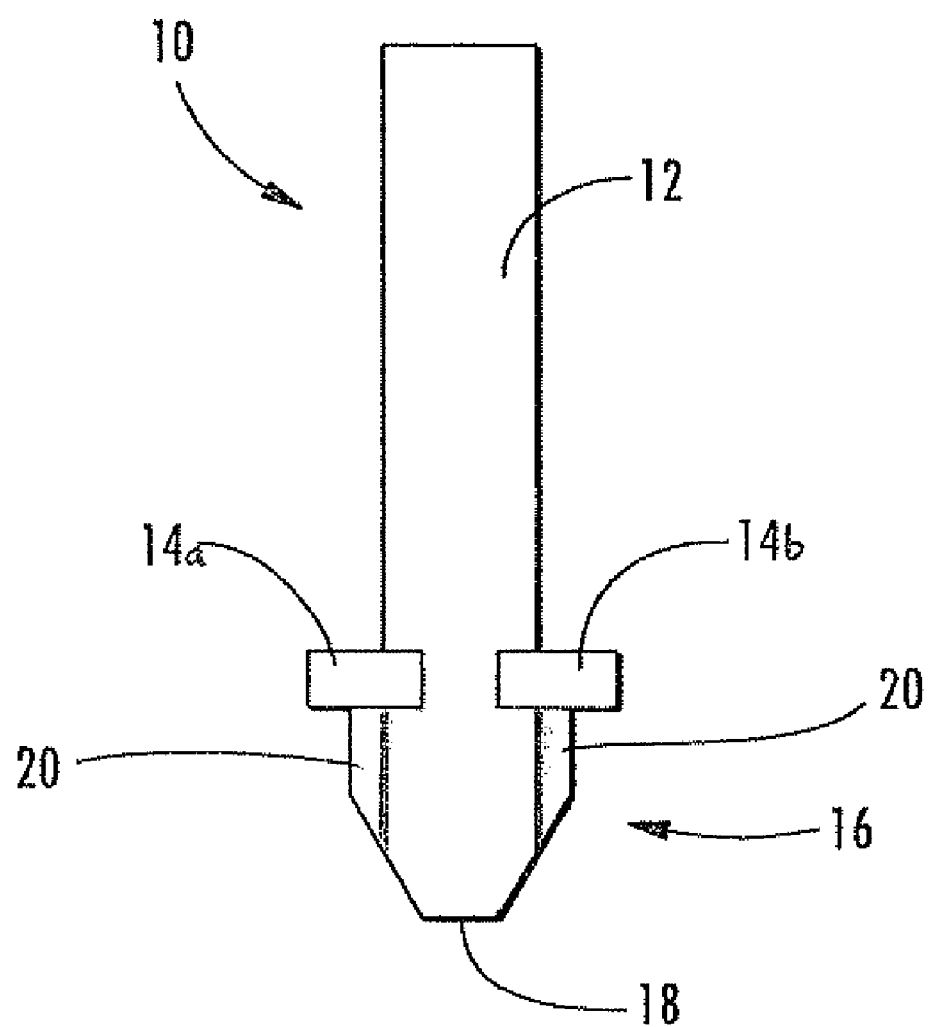
FIG. 9 is a side elevational view of the turbine blade assembly according to still further aspects of the invention, showing a root completed by a secondary root portion, wherein the secondary root portion contributes to the securement of the platform.

FIGS. 1 and 5 show an embodiment of a turbine blade assembly 10 according to aspects of the invention. Generally, the turbine blade 10 includes an airfoil 12, a platform 14, and a root 16, which includes a primary root portion 18 and a secondary root portion 20. Each of these components of the blade 10 will be discussed in turn below.

Figure 2:
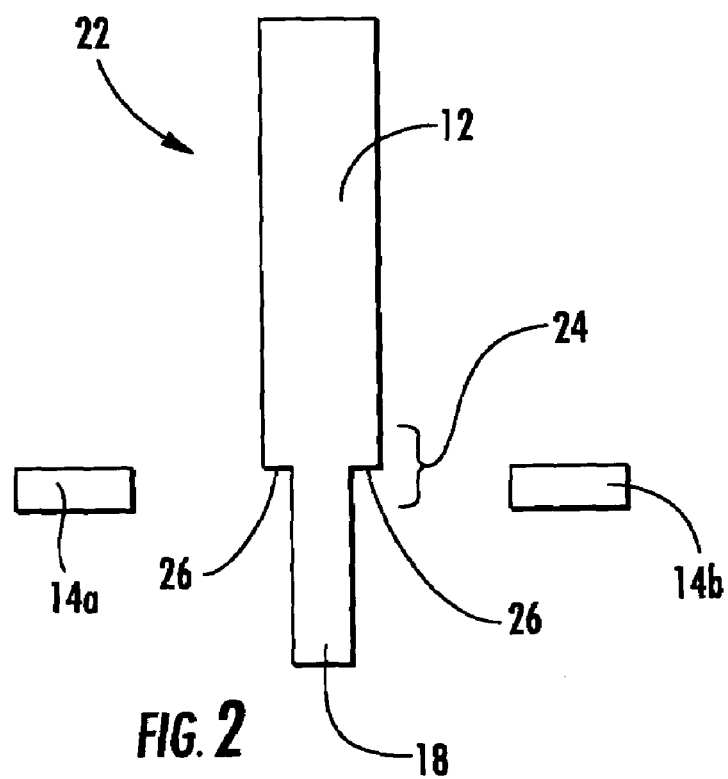
FIG. 2 is a side elevational view of the subcomponents of the turbine blade assembly according to aspects of the invention, showing a separately-formed platform and a structure having an airfoil and a primary root portion.

Referring to FIG. 2, the airfoil 12 and the primary root portion 18 are formed as a unitary structure 22, Which will be referred to as the airfoil/root structure 22 for convenience. The term "unitary" is intended to mean that the airfoil and at least a portion of the primary root portion 18 are a single piece. The airfoil/root structure 22 can be formed by casting and may make use of directional solidification techniques. The airfoil/root structure 22 can be made of any suitable material for the operational environment of the turbine section of a turbine engine. In one embodiment, the airfoil/root structure 22 can be made of a single crystal alloy.

Ideally, any changes in the cross-sectional size of the airfoil/root structure 22 are gradual or otherwise kept as small as possible. Such a construction can support higher casting yields because the geometric features that are typically associated with the formation of defects in current blade constructions have been removed.

In a preferred embodiment, as shown in FIG. 2, the cross-sectional size of the primary root portion 18 is less than the cross-sectional size of the airfoil 12 at least in the transition region 24 between the airfoil 12 and the primary root portion 18. In such case, the airfoil 12 can overhang the primary root portion 18 to define a lip 26. The lip 26 can be substantially flat, or it can include any of a number of features. As noted earlier, the airfoil/root structure 22 according to aspects of the invention can be formed by casting using directional solidification techniques. In such case, the airfoil/root structure 22 can be cast "tip down," with the airfoil 12 directed toward the ground and the primary root portion 16 up. Thus, in forming the structure 22, solidification begins at the airfoil 12 and ends at the primary root portion 18. In such case, the likelihood of defect formation is minimized because the cross-sectional size of the structure 22 decreases as opposed to increases, as is the case in known blade constructions.

It will be understood that aspects of the invention are not limited to a structure 22 in which the cross-sectional size of the primary root portion 18 is smaller than the airfoil 12. In other embodiments, the cross-sectional size of the primary root portion 18 can be substantially equal to or even slightly greater than the cross-sectional size of the airfoil 12.

It should be noted that the transition between the airfoil 12 and the primary root portion 18 can have various configurations, and aspects of the invention are not limited to the specific configuration shown in FIGS. 2-5. Preferably, the transition-region 24 does not include sharp corners. The primary root portion 18 can be substantially centrally positioned relative to the airfoil 12. The primary root portion 18 can have any suitable cross-sectional shape. For example, the primary root portion 18 can be rectangular, circular, elliptical or polygonal.

The root 16 can be completed by creating the secondary root portion 20 in one or more subsequent processes so that the root 16 is within its final design dimensions or parameters. The secondary root portion 20 can be created in any of a number of ways. In one embodiment, the secondary root portion 20 can be formed by powder metallurgy. The secondary root portion 20 can be made of any suitable material including, for example, U-720. As will be explained in more detail below, the secondary root portion 20 can serve to secure the platform 14 to the airfoil/root structure 22. The secondary root portion 20 can be sized and shaped as needed to engage a rotor disc in the turbine section of the engine.

Figure 3:
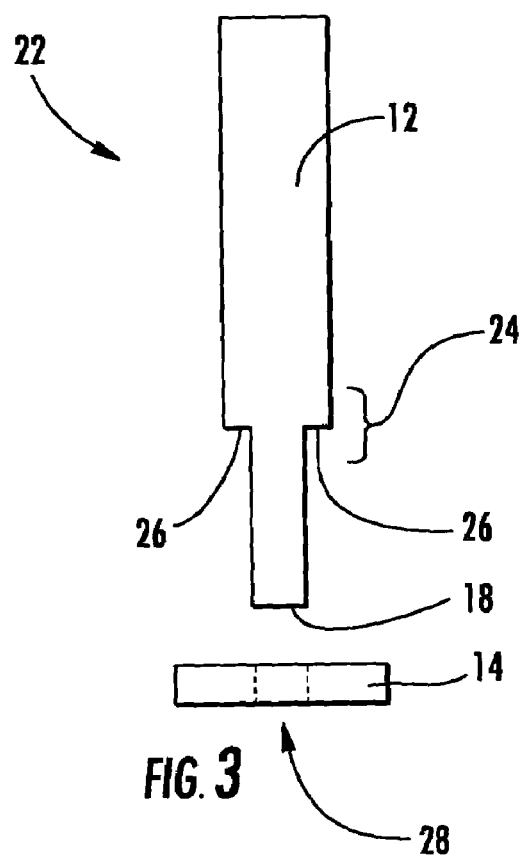
FIG. 3 is a side elevational view of the subcomponents of the turbine blade assembly according to aspects of the invention, showing the structure and an alternative embodiment of the separately-formed platform.

The platform 14 according to aspects of the invention is formed separately from the airfoil/root structure 22. The platform 14 can be made of any number of materials including, for example, single crystal alloys. In one embodiment, the platform 14 and the airfoil/root structure 22 can be made of the same material. The platform 14 can be made by any suitable manufacturing process including, for example, casting (conventional casting or directional solidification), forging or machining. In one embodiment, the platform 14 can be a single piece, as shown in FIG. 3. The platform 14 can have a passage 28 adapted to receive the primary root portion 18 of the airfoil/root structure 22. Preferably, the passage 28 is centrally located on the platform 14. The platform 14 can be configured to substantially matingly engage the primary root portion 18 and the lip 26. Alternatively, the platform 14 can be made of two or more segments 14a, 14b, as shown in FIG. 2. In such case, the platform segments 14a, 14b can cooperate to substantially matingly engage the primary root portion 18 and the lip 26.

Figure 4:
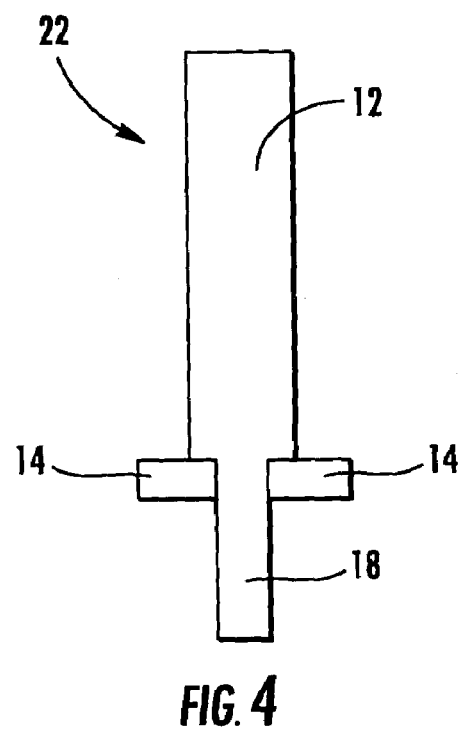
FIG. 4 is a side elevational view of the subcomponents of the turbine blade assembly according to aspects of the invention, showing the platform positioned in engagement with the structure.

Having described the individual components of a turbine blade according to aspects of the invention, one manner of assembling such a blade will now be described. After each of the sub-components has been formed, the platform 14 and the airfoil/root structure 22 can be brought together so that the platform 14 engages the airfoil/root structure 22 in the transition region 24. For instance, the platform 14 can engage the lip 26 and a portion of the primary root portion 18 of the airfoil/root structure 22, as shown in FIG. 4. In the case of a single piece platform 14, the passage 28 in the platform 14 can receive the primary root portion 18 until the platform 14 engages the lip 26.

With the platform 14 positioned on the airfoil/root structure 22, the root 16 can be completed by creating the secondary root portion 20 by any of a number of subsequent processes. In one embodiment, the secondary root portion 20 can be formed by powder metallurgy. To that end, a mold can be operatively connected as appropriate to the blade sub-assembly. The mold can be filled with a powder. By applying pressure, high temperature, long setting times, or any combination thereof to the powder, the secondary root portion 20 can be created. Thus, it will be appreciated that the platform 14 can be secured in place by virtue of being clamped or compressed between the secondary root portion 20 and the airfoil/root structure 22, such as the lip 26. Alternatively or in addition, the platform 14 can be bonded to the airfoil/root structure 22 and the secondary root portion 20. The root 16 can be completed in any of a number of ways so long as the finished root 16 is within its final design dimensions or parameters and such that the secondary root portion 20 contributes to the securement of the platform 14.

It will be appreciated that, by minimizing large changes in section size, a turbine blade assembly 10 according to aspects of the invention can reduce the tendency for defects to form during the manufacturing process. As a result, there will be greater casting yields, which, in turn, can amount to significant cost savings.

The foregoing description is provided in the context of one possible turbine blade assembly and associated method of making such an assembly. While having particular application to turbine blades, it will be readily appreciated how aspects of the invention can be used to form other turbine engine components. It will of course be understood that the invention is not limited to the specific details described herein, which are given by way of example only, and that various modifications and alterations are possible within the scope of the invention as defined in the following claims.

What is claimed is:

1. A turbine blade assembly comprising:
   a unitary structure made of a single crystal alloy having an airfoil and a primary root portion;
   a separately formed platform; and
   a secondary root portion made of a powder metallurgy material, wherein the primary and secondary root portions cooperatively define a root and wherein the platform is secured between the structure and the secondary root portion.

2. The assembly of claim 1 wherein the platform is made of a single piece with a passage extending therethrough, wherein the primary root portion is received within the passage.

3. The assembly of claim 1 wherein the platform is made of a plurality of platform segments.

4. The assembly of claim 1, wherein the platform is made of a single crystal alloy.

5. The assembly of claim 1 wherein the platform is further secured to at least the structure by bonding.

6. The assembly of claim 1 wherein the primary root portion extends from a substantially central region of the airfoil.

7. The assembly of claim 1 wherein the structure includes a region in which the airfoil transitions into the primary root portion, wherein the cross-sectional size of the airfoil is greater than the cross-sectional size of the primary root portion in at least the region, wherein a portion of the airfoil overhangs the first root portion so as to define a lip, wherein the platform is secured between the lip and the secondary root portion.

8. A turbine blade assembly comprising:
   a unitary structure having an airfoil and a primary root portion;
   a separately formed platform; and
   a secondary root portion, wherein the primary and secondary root portions cooperatively define a root and wherein the platform is secured between the structure and the secondary root portion,
   wherein the structure includes a region in which the airfoil transitions into the primary root portion, wherein the cross-sectional size of the airfoil is substantially identical to the cross-sectional size of the primary root portion in at least the region.

9. A turbine blade assembly comprising:
   a unitary structure having an airfoil and a primary root portion;
   a separately formed platform; and
   a secondary root portion, wherein the primary and secondary root portions cooperatively define a root and wherein the platform is secured between the structure and the secondary root portion,
   wherein the structure includes a region in which the airfoil transitions into the primary root portion, wherein the cross-sectional size of the airfoil is less than the cross-sectional size of the primary root portion in at least the region.

10. A method of forming a turbine blade comprising the steps of:
    casting a single crystal alloy unitary structure having an airfoil and a portion of a root;
    separately forming a platform;
    positioning the platform into engagement with a transition region of the structure between the airfoil and the portion of the root; and
    completing the root to its final design dimensions by forming a secondary root portion using powder metallurgy, wherein the platform is secured between the structure and the secondary root portion.

11. The method claim 10 wherein the structure forming step is performed using directional solidification.

12. The method claim 10 wherein the platform forming step is performed by one of casting, machining and forging.

13. The method of claim 10 farther including the step of bonding the platform to the unitary structure.

14. The method of claim 10 wherein the cross-sectional size of the portion of the root is less than the cross-sectional size of the airfoil at least in the transition region.

15. The method of claim 10 wherein the cross-sectional size of the portion of the root is substantially equal to the cross-sectional size of the airfoil at least in the transition region.

16. The method of claim 10 wherein the cross-sectional size of the portion of the root is slightly greater than the cross-sectional size of the airfoil at least in the transition region.

* * * * *